E. D. ANDERSON.
CARTONING MACHINE.
APPLICATION FILED JUNE 28, 1919.
1,376,499.
Patented May 3, 1921.
14 SHEETS—SHEET 2.
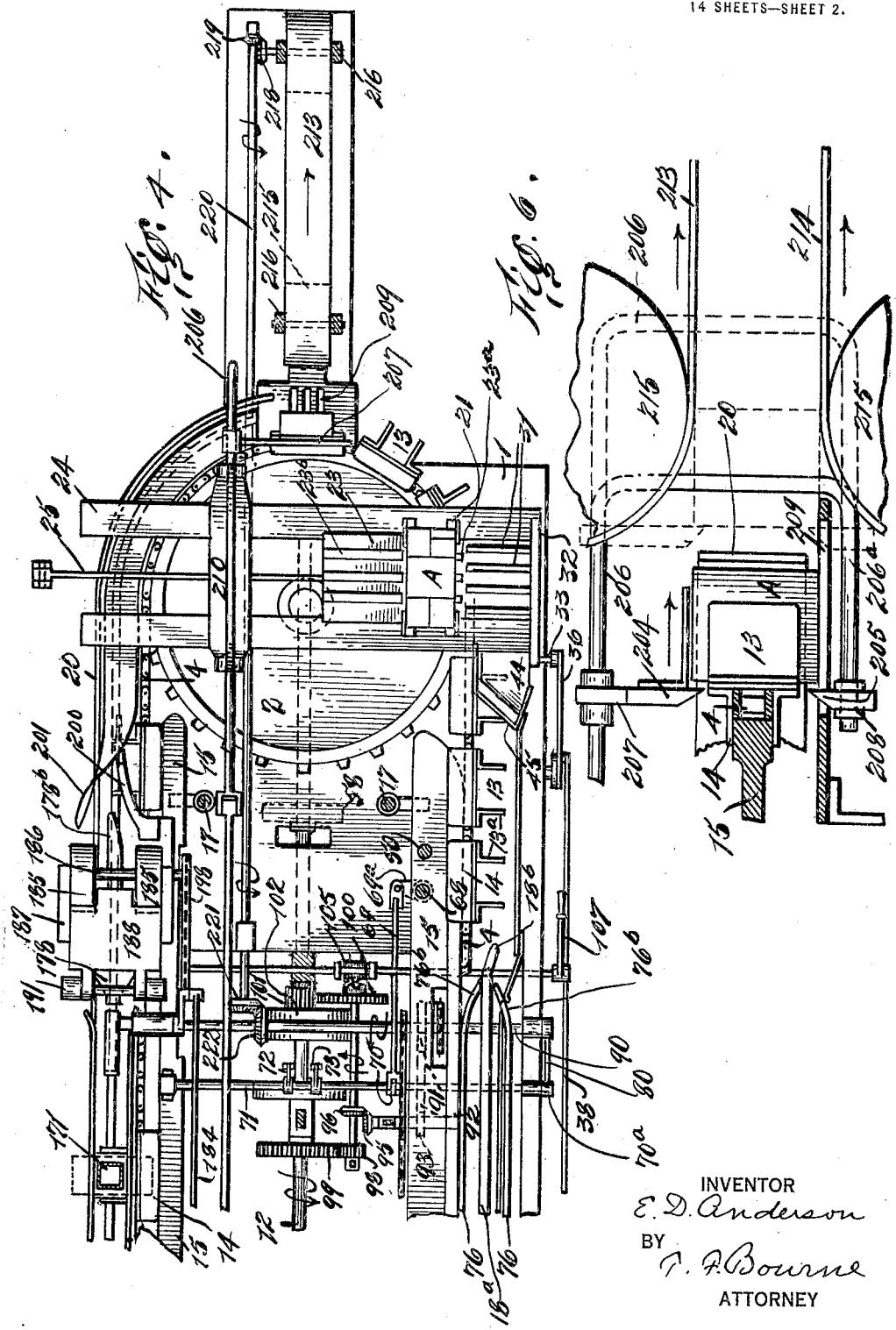
INVENTOR
E. D. Anderson
BY
T. F. Bourne
ATTORNEY

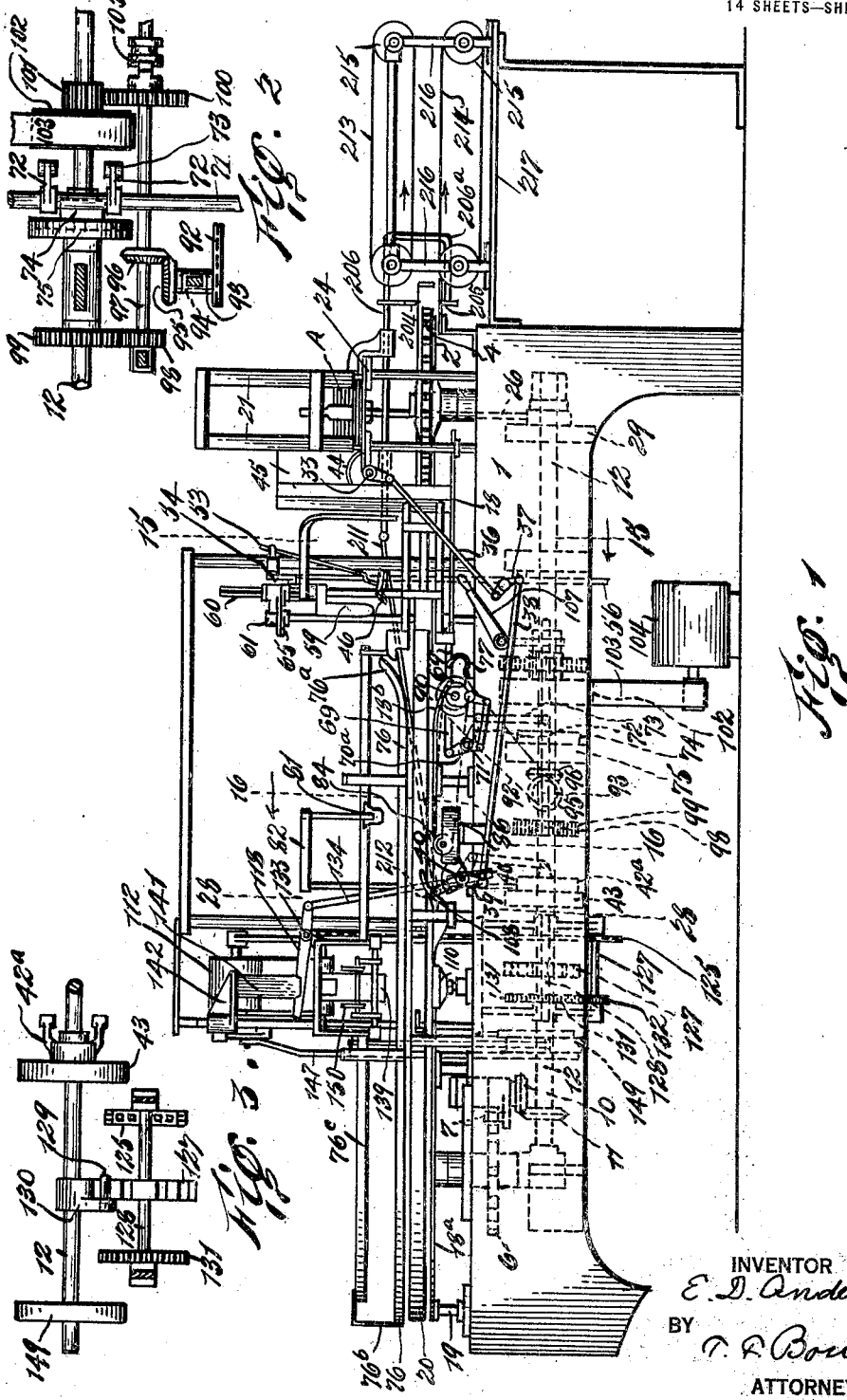

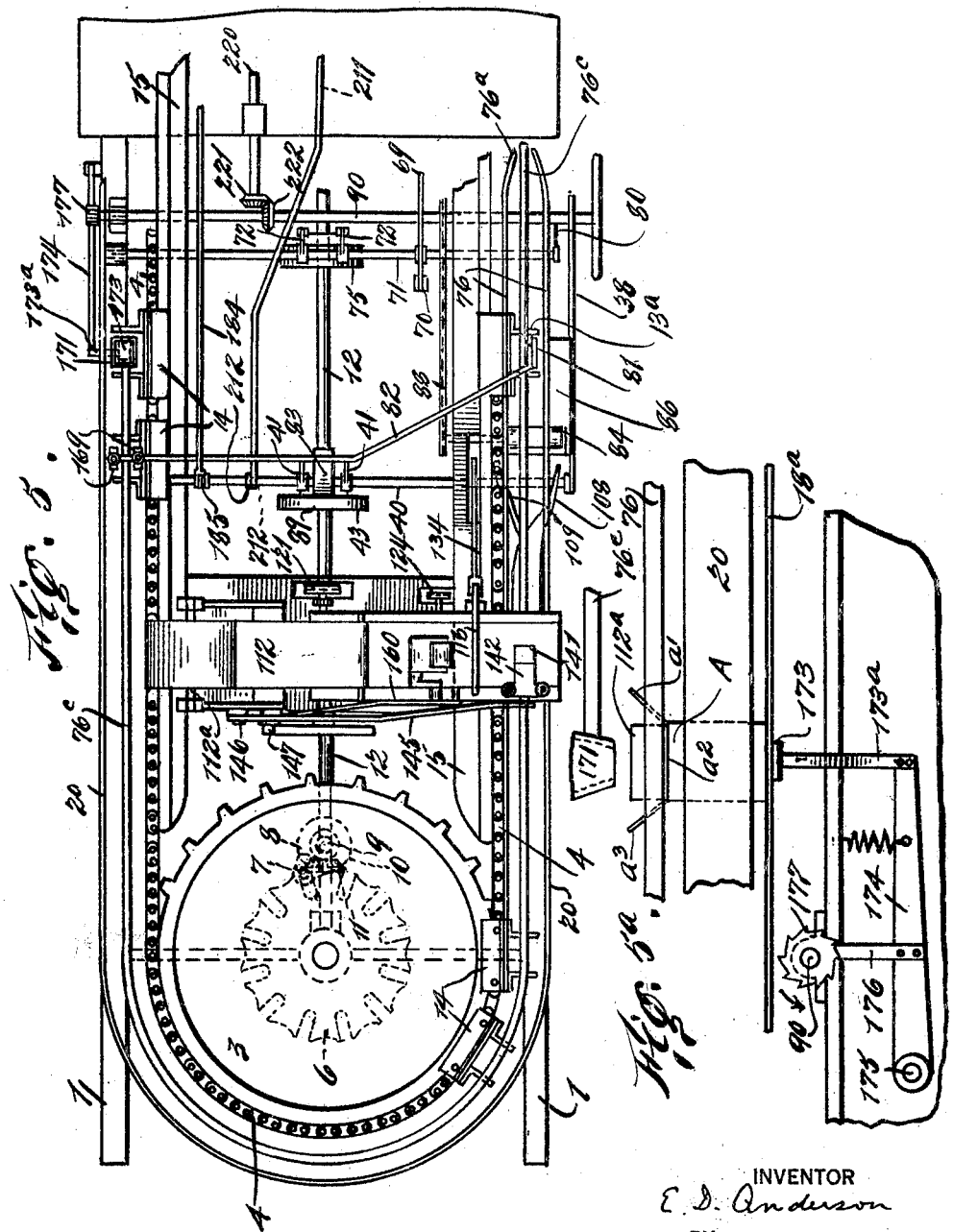

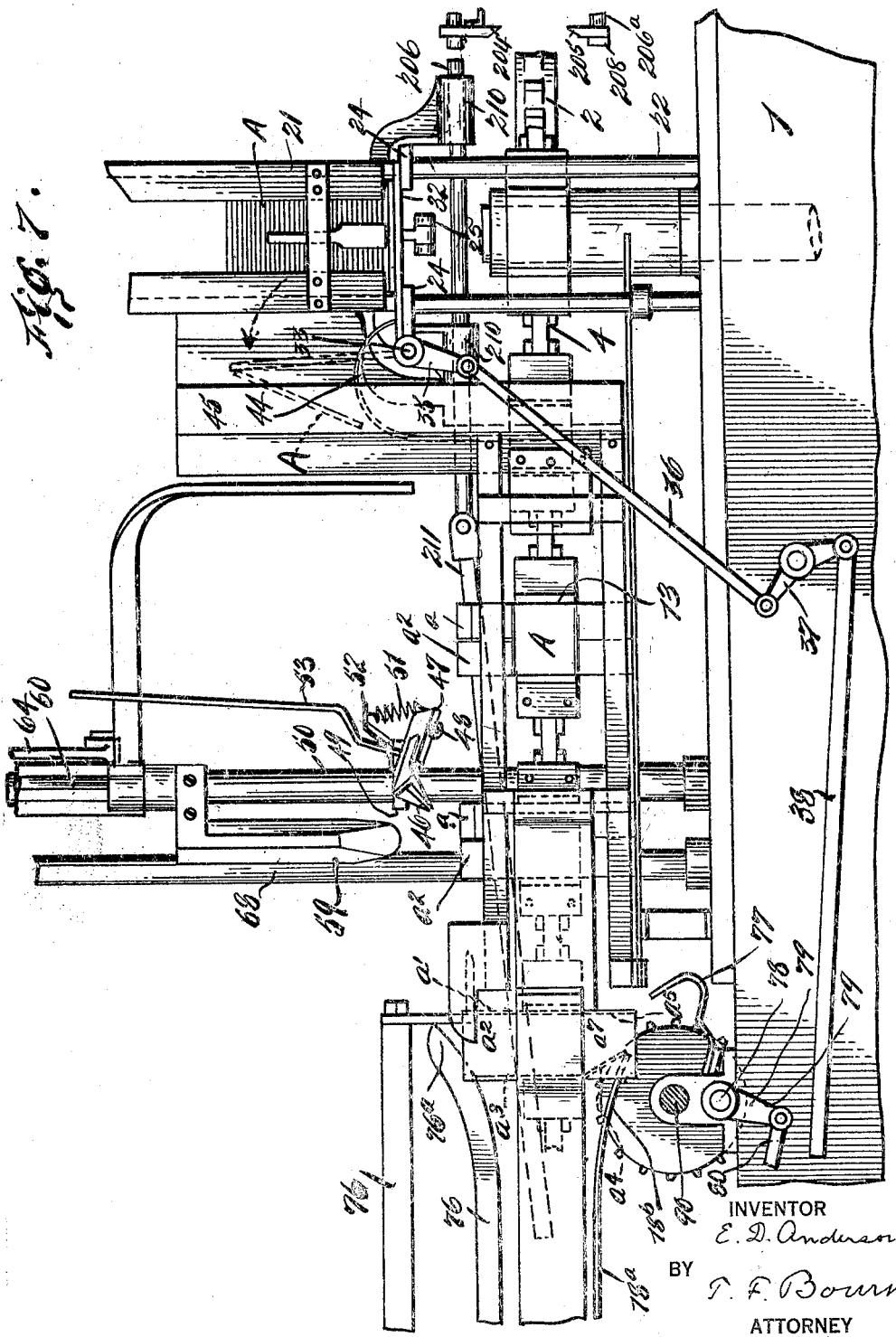

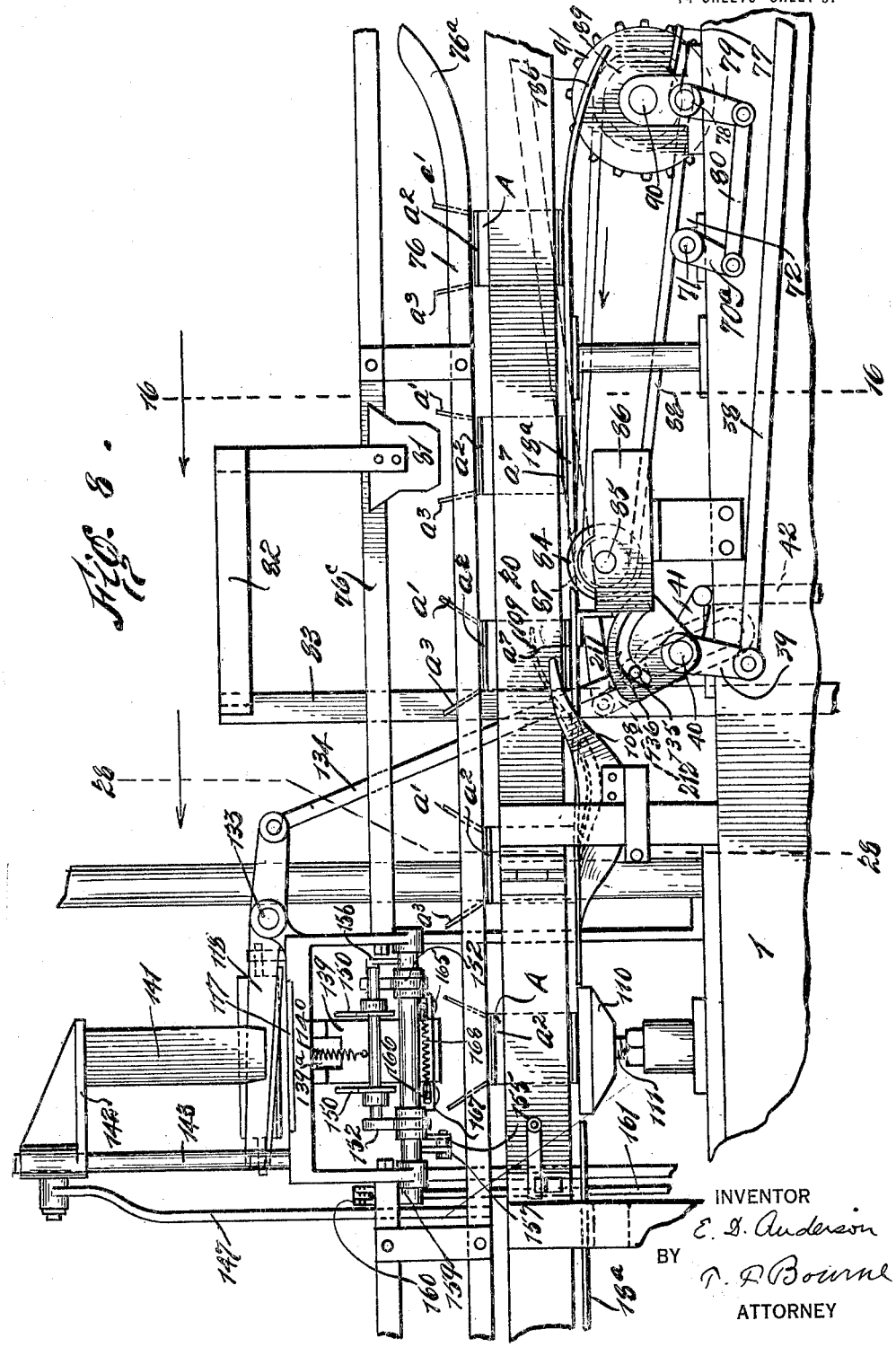

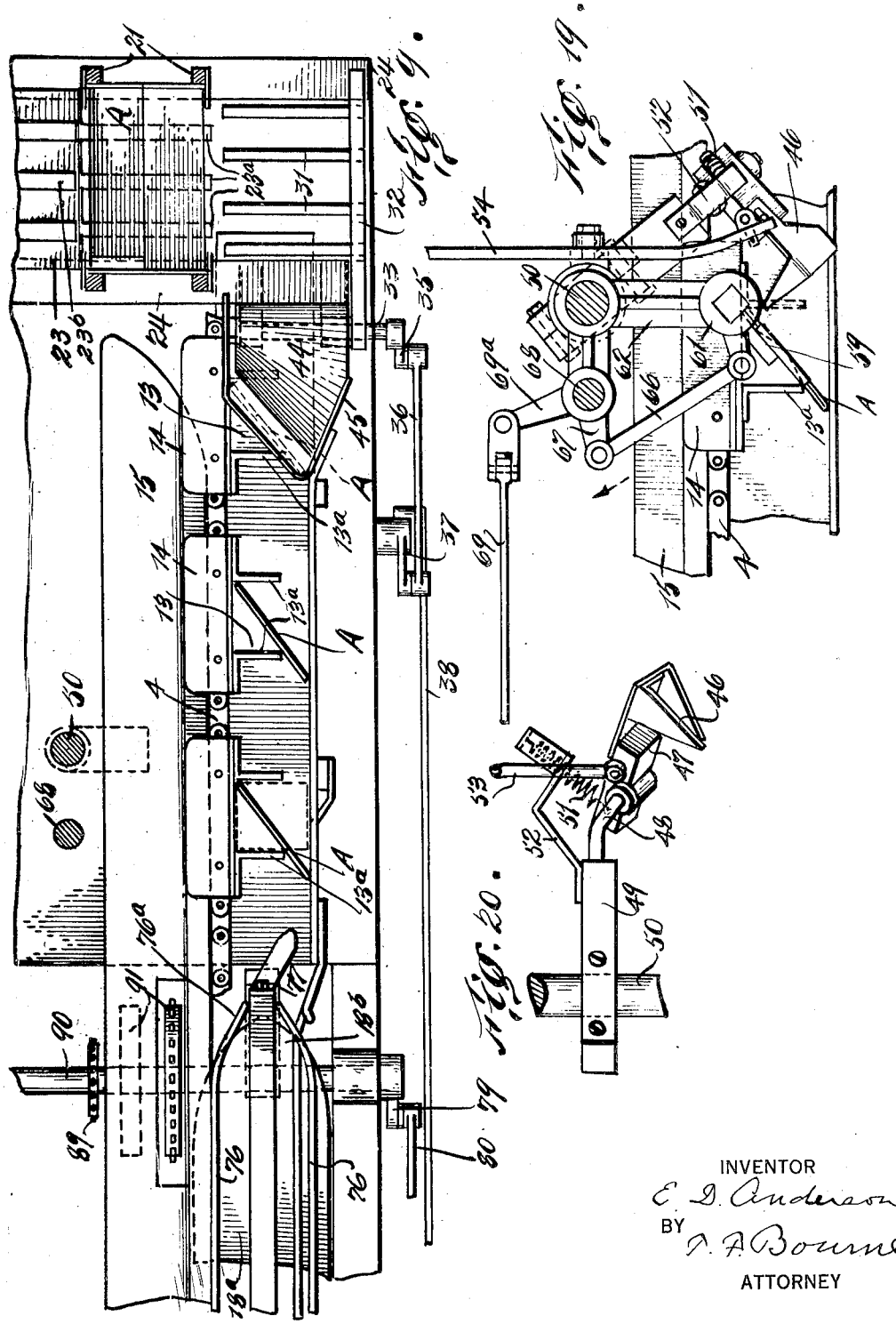

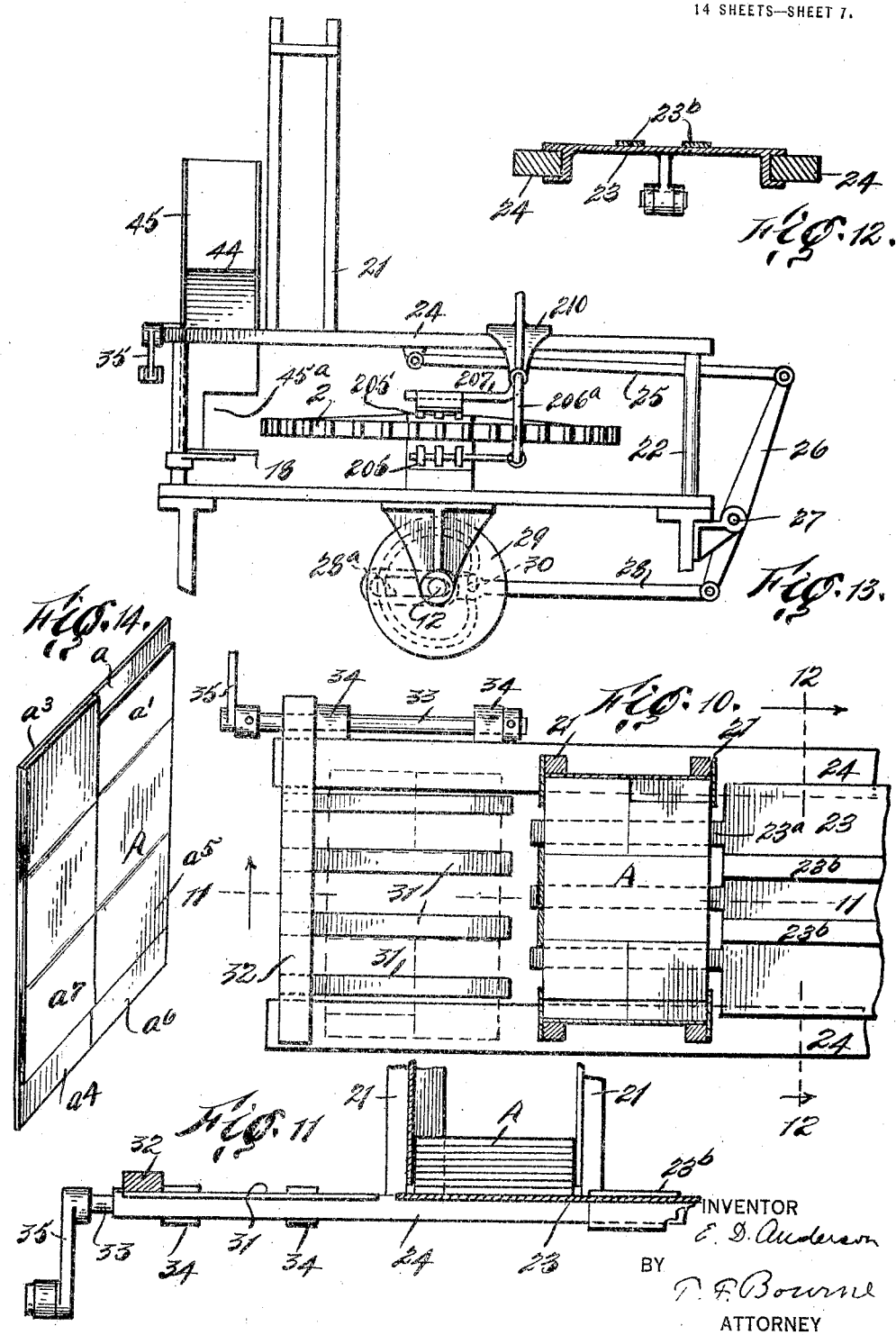

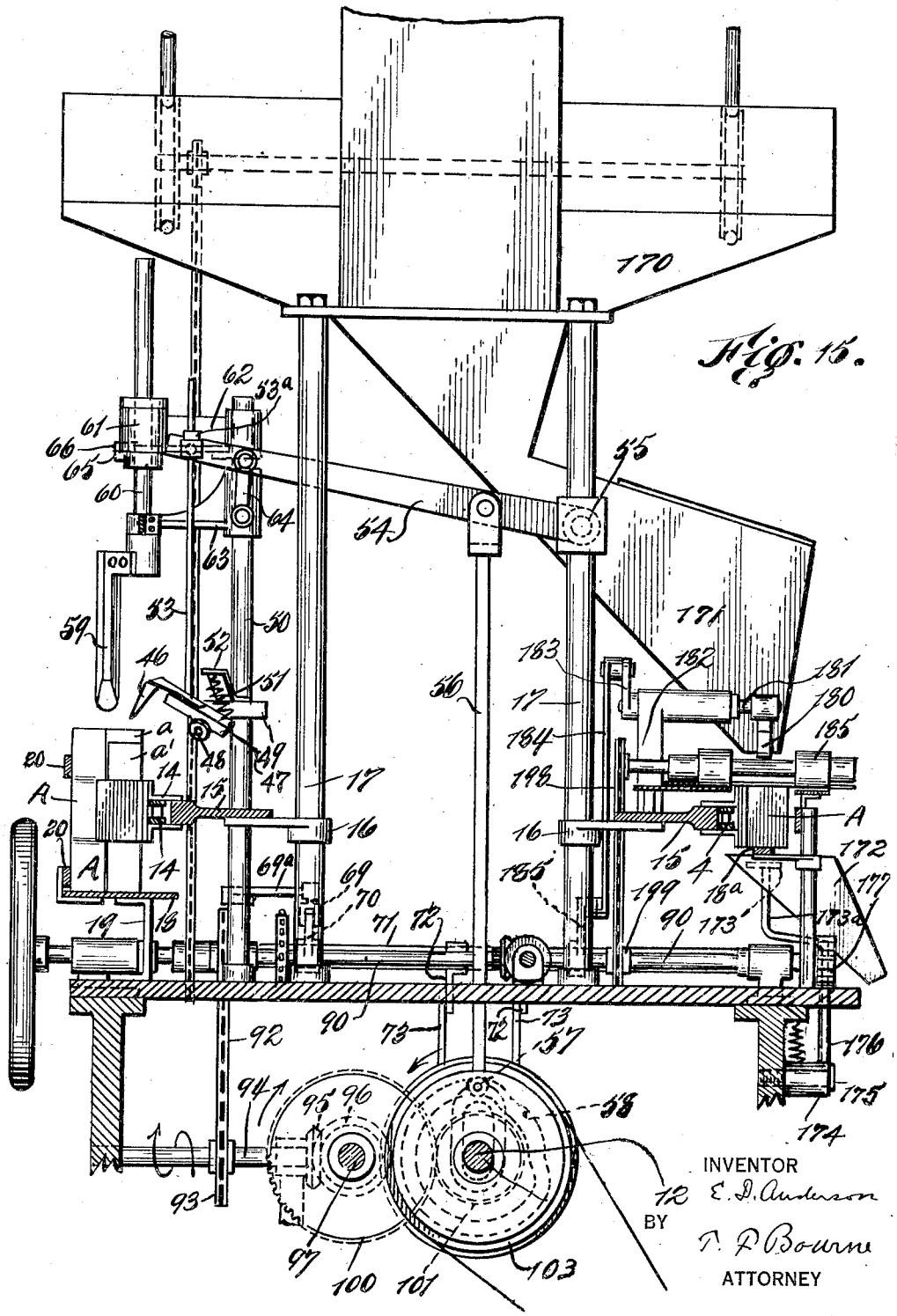

E. D. ANDERSON.
CARTONING MACHINE.
APPLICATION FILED JUNE 28, 1919.
1,376,499.
Patented May 3, 1921.
14 SHEETS—SHEET 9.
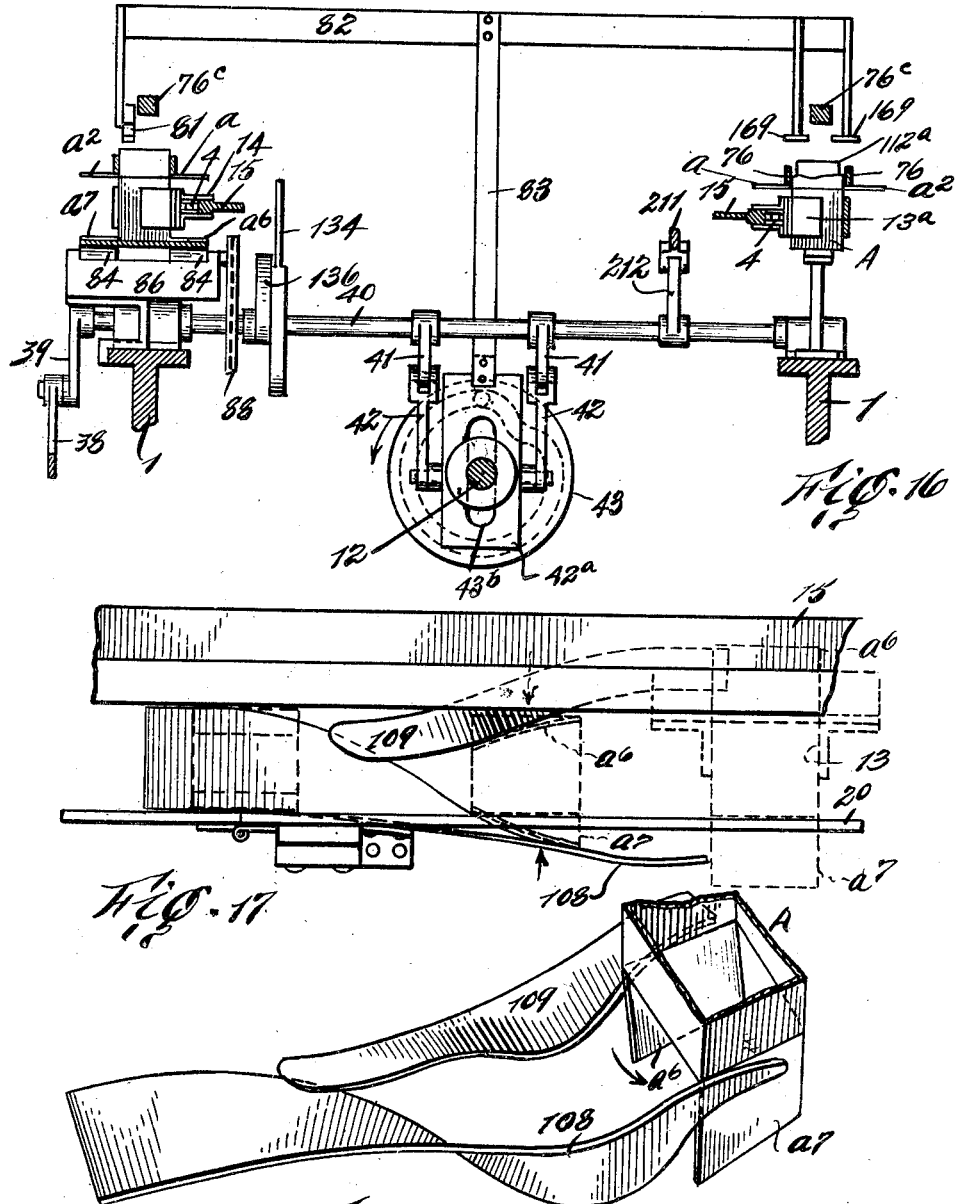

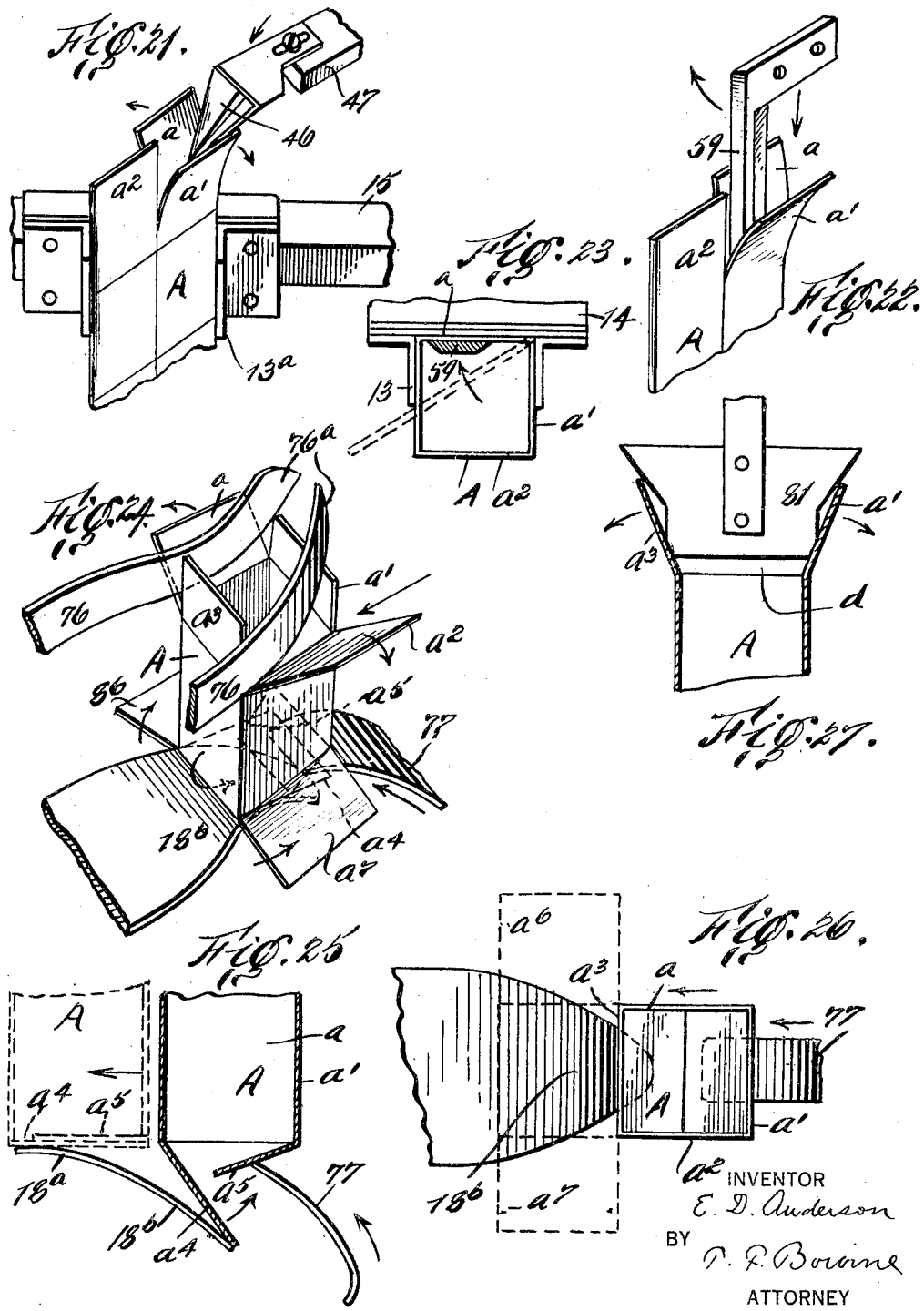

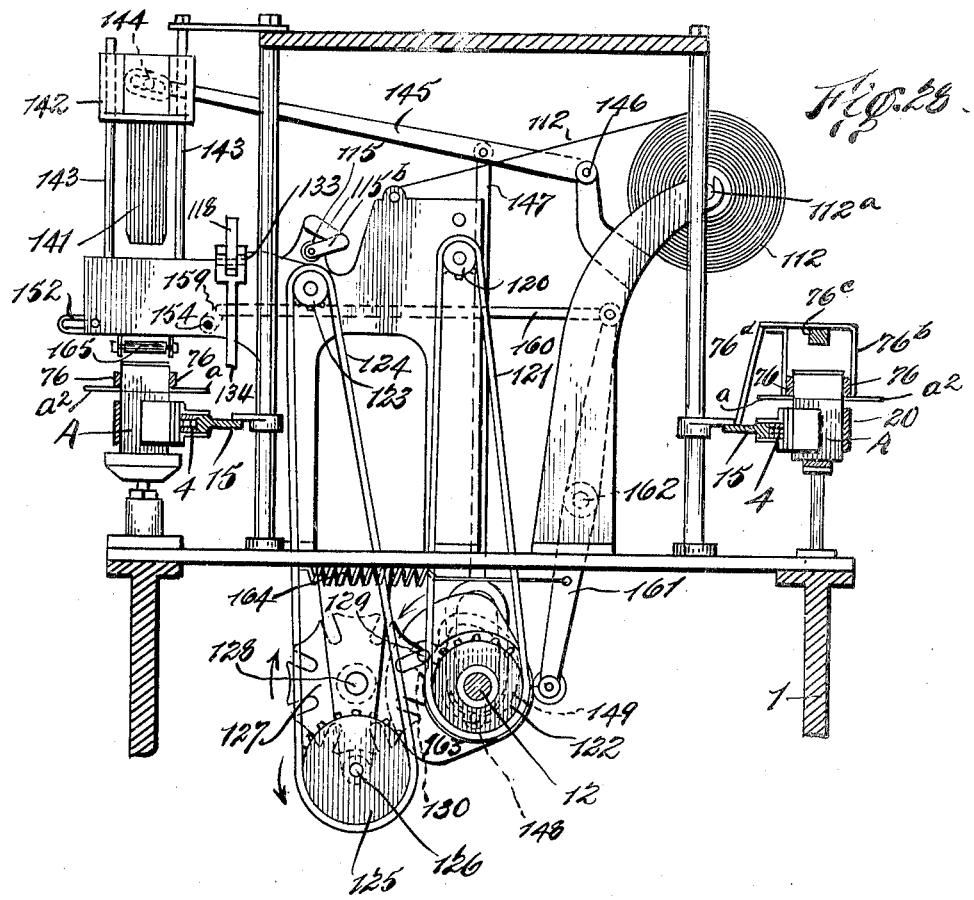
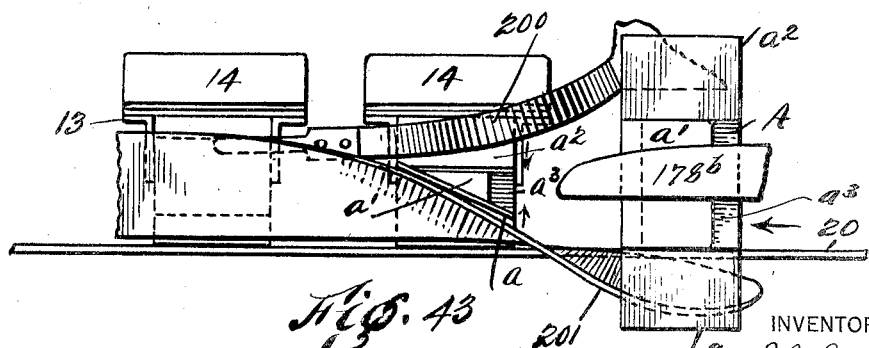

E. D. ANDERSON.
CARTONING MACHINE.
APPLICATION FILED JUNE 28, 1919.
1,376,499.
Patented May 3, 1921.
14 SHEETS—SHEET 12.
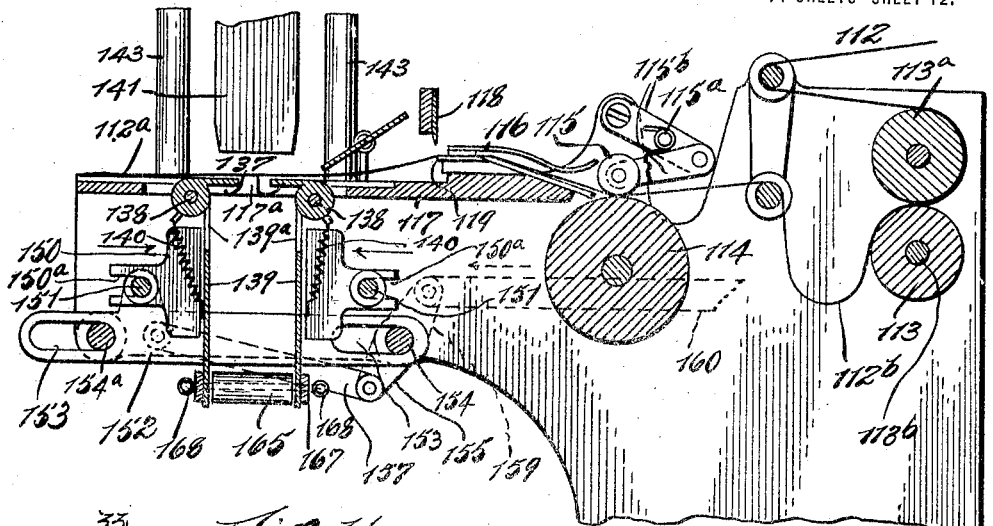
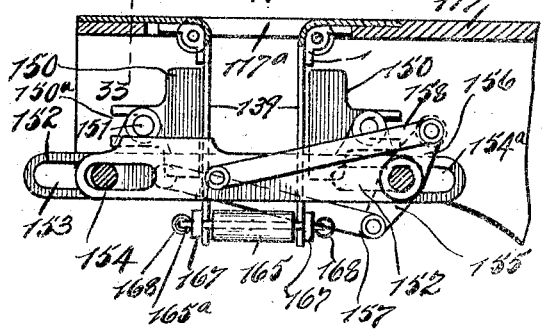
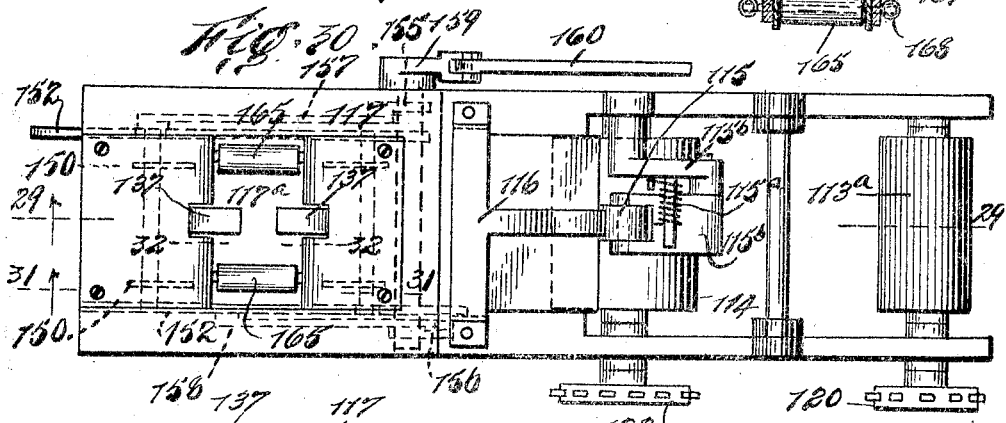
INVENTOR
E. D. Anderson
BY
D. C. Bourne
ATTORNEY

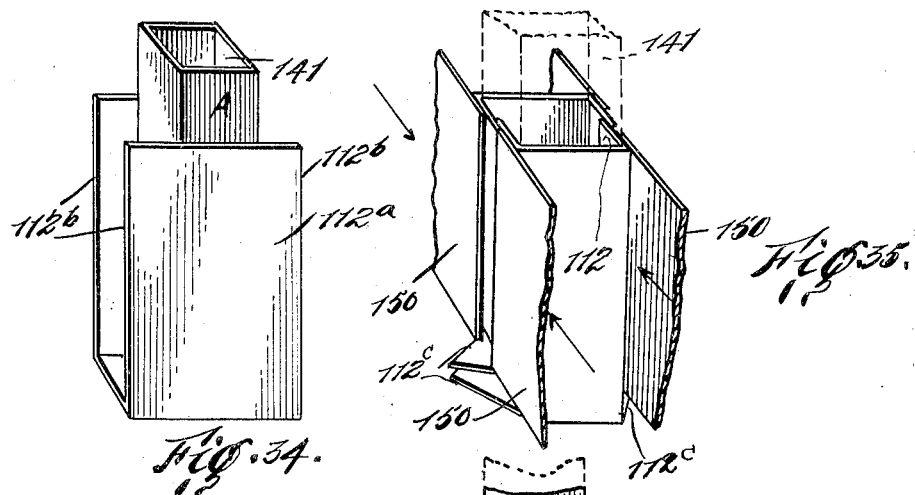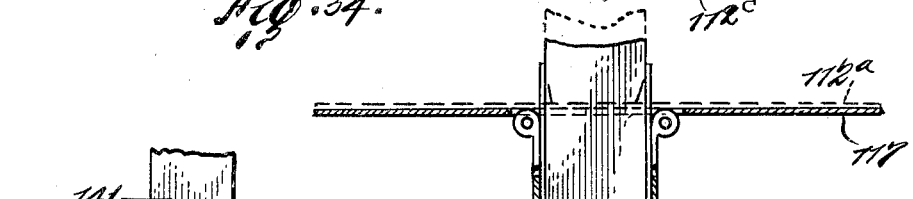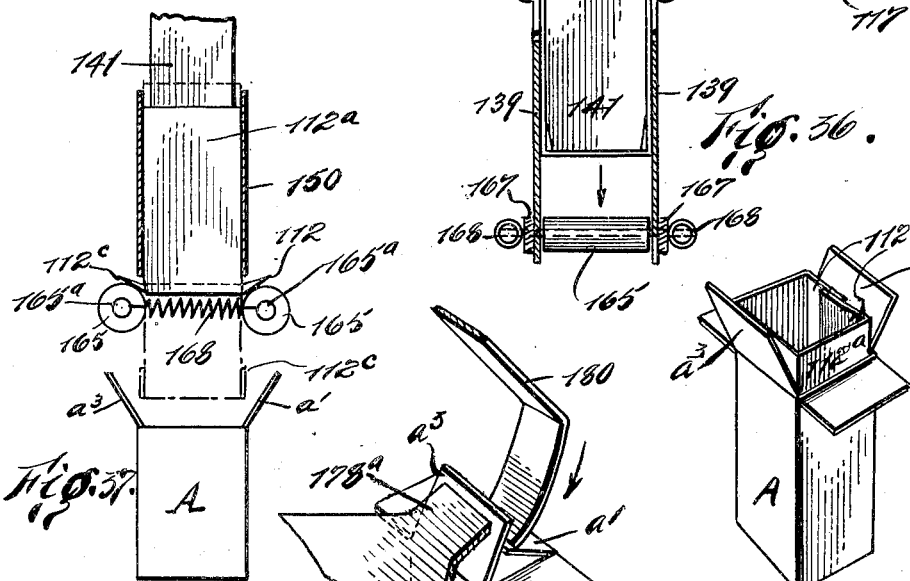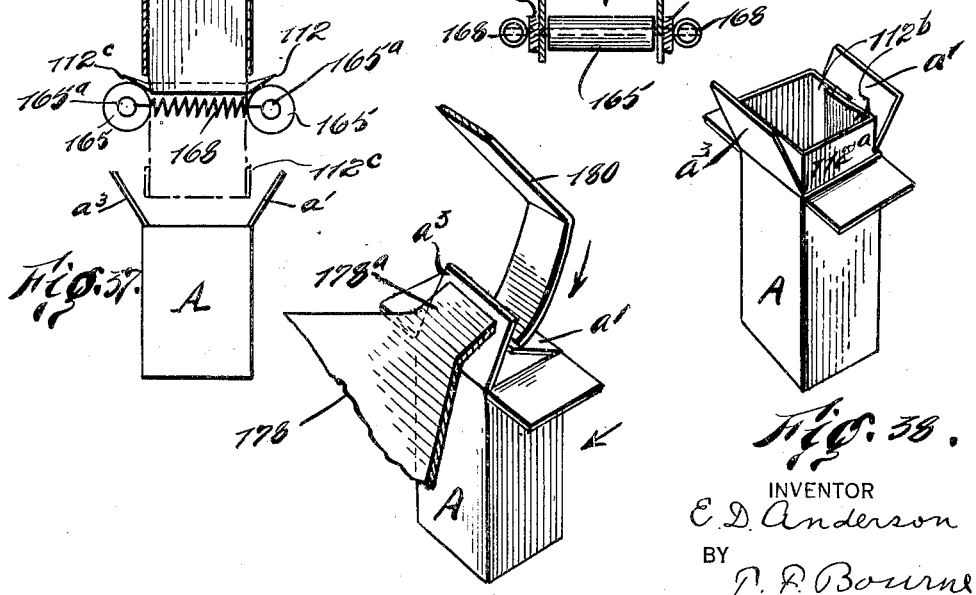

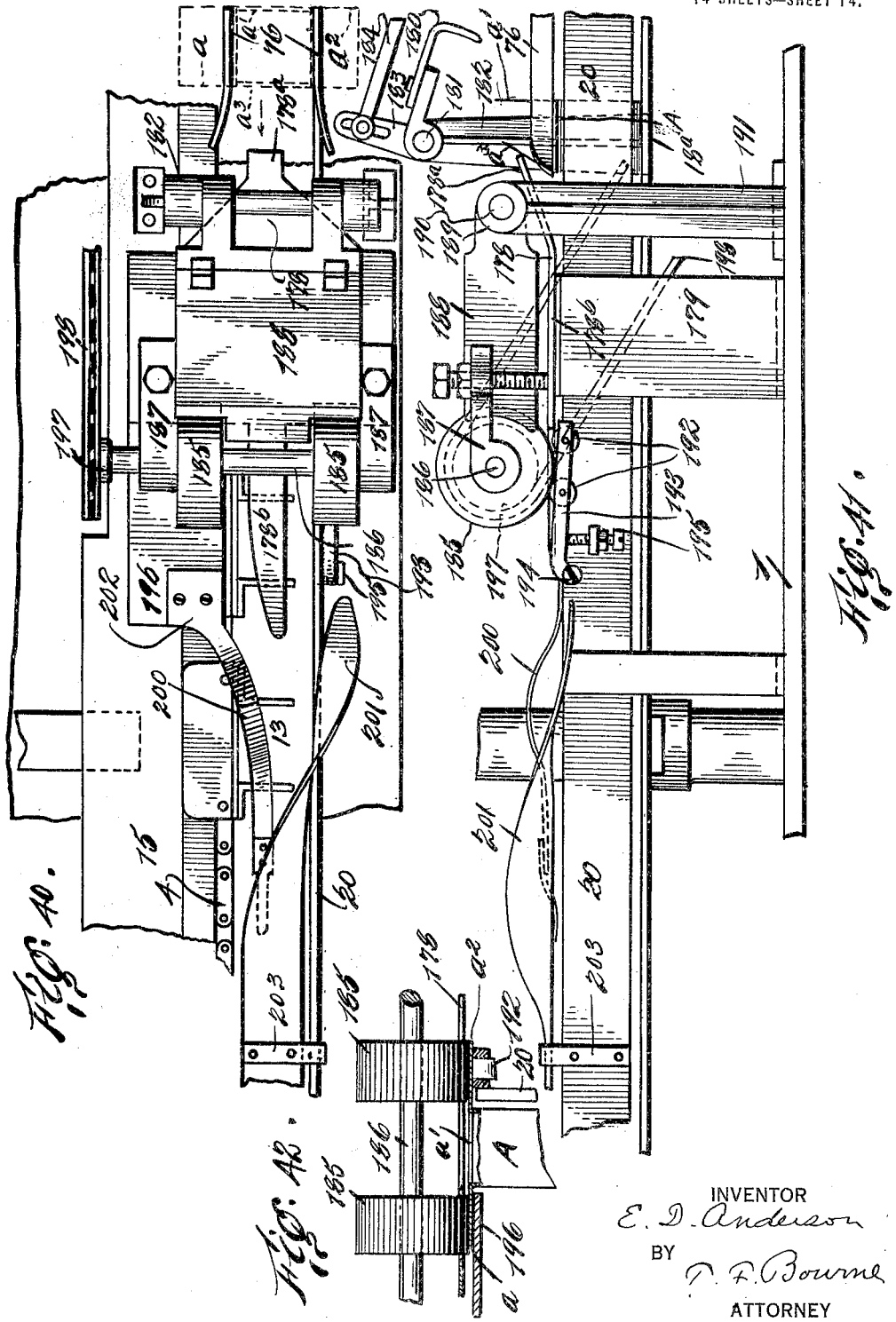

UNITED STATES PATENT OFFICE.

ERNEST D. ANDERSON, OF NEW YORK, N. Y., ASSIGNOR TO E. D. ANDERSON, INC., OF NEW YORK, N. Y., A CORPORATION OF NEW YORK.

CARTONING-MACHINE.

1,376,499.  Specification of Letters Patent.  Patented May 3, 1921.

Application filed June 28, 1919. Serial No. 307,394.

*To all whom it may concern:*

Be it known that I, ERNEST D. ANDERSON, a citizen of the United States, and resident of New York, borough of Manhattan, in the county of New York and State of New York, have invented certain new and useful Improvements in Cartoning-Machines, of which the following is a specification.

This invention pertains to improvements in machines for supplying and opening receptacles or cartons having flaps at the ends and for closing and sealing the flaps and charging the receptacles in a continuous manner, whereby the charged and sealed receptacles are successively delivered from the machine.

The invention comprises novel details of improvement and combination of parts that will be more fully hereinafter set forth and then pointed out in the claims.

Reference is to be had to the accompanying drawings forming part hereof in which, Figure 1 is a side elevation of a machine embodying this invention;

Fig. 2 is an enlarged plan view of driving mechanism;

Fig. 3 is a similar view of a portion of the main shaft with means for operating receptacle lining means hereinafter referred to;

Figs. 4 and 5 are plan views of different end portions of the machine, to be read together;

Fig. 5ᵃ is an enlarged detail view of the carton agitator located at the filling station, looking from the upper portion of Fig. 5;

Fig. 6 is an enlarged sectional detail side view of the ejecting mechanism for the charged receptacles;

Figs. 7 and 8 are enlarged detail side views to be read together, of parts illustrated in Fig. 1;

Fig. 9 is an enlarged detail plan view, illustrating the receptacle or carton magazine and the device adjacent thereto;

Fig. 10 is a sectional plan view of the receptacle or carton supplying devices;

Fig. 11 is a section on the line 11—11 of Fig. 10;

Fig. 12 is a cross section on the line 12—12 of Fig. 10;

Fig. 13 is a skeleton end view of the machine, looking from the right in Fig. 1, illustrating means for ejecting collapsed receptacles or cartons from the magazine, and illustrating ejecting means for the charged receptacles or cartons;

Fig. 14 is a perspective view of a receptacle or carton in flat condition;

Fig. 15 is an enlarged cross section substantially on the line 15—15 of Fig. 1;

Fig. 16 is an enlarged cross section substantially on the line 16—16 in Fig. 1;

Fig. 17 is an enlarged plan view of folders for the bottom side flaps of the receptacles or cartons;

Fig. 18 is a detail perspective view of part of Fig. 17;

Fig. 19 (Sheet 6) is a sectional plan view, enlarged, of means for opening the receptacles or cartons;

Fig. 20 is a detail view illustrating the flap spreader, operative previous to the insertion of the opener in the receptacles;

Fig. 21 is a detail perspective view illustrating the first operation for opening the receptacles or cartons;

Fig. 22 illustrates a further step for opening the receptacles;

Fig. 23 illustrates an opened receptacle in its receiver of the conveyer;

Fig. 24 is a diagrammatic perspective view, illustrating projections for folding and spreading certain of the flaps of opened receptacles;

Fig. 25 is a diagrammatic detail illustrating folding of certain lower flaps of the receptacles;

Fig. 26 is a plan view of Fig. 25;

Fig. 27 is a sectional detail illustrating spreading of upper flaps $a'$, $a^3$ of the receptacles;

Fig. 28 is an enlarged detail sectional view substantially on the line 28—28 of Fig. 1;

Fig. 29 is an enlarged section of means for lining the opened receptacles or cartons, taken substantially on the line 29—29 in Fig. 30;

Fig. 30 is a plan view of Fig. 29;

Fig. 31 is a section on the line 31—31 in Fig. 30;

Fig. 32 is a section on the line 32—32 of Fig. 30;

Fig. 33 is a section on the line 33—33 of Fig. 31;

Figs. 34 to 37 are diagrammatic views illustrating operations in folding and applying the lining to the receptacles or cartons;

Fig. 38 is a perspective view illustrating the lining partially in position within the opened receptacle;

Fig. 39 is a diagrammatic view illustrating closing of the top end flaps of a filled receptacle;

Fig. 40 is an enlarged plan view of means for folding the top flaps of charged receptacles, parts of which are also shown in Fig. 4, the view being taken from the upper side of Fig. 4;

Fig. 41 is a side view of Fig. 40;

Fig. 42 is a detail view illustrating pasting rolls of Figs. 40, 41;

Fig. 43 (Sheet 11) is a detail plan view illustrating top flaps of receptacles being folded.

At 1 is indicated the main frame of the machine which may be of any suitable construction, adjacent to the opposite ends of which horizontally disposed sprocket wheels 2, 3 are journaled to receive an endless conveyer 4, shown in the form of a chain horizontally disposed. Sprocket 2 is carried by a suitable pivot or shaft journaled in frame 1 and sprocket 3 is secured to shaft 5 journaled in the frame, which sprocket is rotated step by step to correspondingly operate the conveyer. For such purpose shaft 5 is provided with slotted or recessed member 6 of a Geneva movement coöperative with projection or roller 7 that is carried by an arm 8 supported by shaft 9 journaled on the main frame (Fig. 5). The shaft 9 is shown provided with a gear 10 connected with gear 11 on the drive shaft 12 journaled in main frame (Fig. 1), whereby when said shaft is continuously rotated by any suitable driving power the conveyer will be moved step by step. The conveyer is provided with spaced receivers 13 shown projecting outwardly and laterally, adapted to receive receptacles or cartons A. The receivers are shown comprising pairs of members 13ª spaced along the conveyer, open above and below to receive the receptacles or cartons, and open laterally for release of the charged receptacles. On the sides of the conveyer chain opposite the receivers are laterally disposed spaced guiding members 14 (Fig. 6) which may be riveted to the chain and receive therebetween guiding rails 15 located on opposite sides of the machine between sprockets 2 and 3 and within the conveyer chain for maintaining the conveyer and its receiver in proper position as it travels, (Figs. 4, 5 and 6). The guides 15 are shown supported upon brackets 16 secured to posts 17 carried by the main frame (Fig. 15).

Extending around the machine beneath the conveyer are guiding ways 18, 18ª, suitably supported by posts 19, upon which guiding ways the receptacles slide. Outside of the conveyer is a guard 20 along which the receptacles pass, whereby said receptacles are retained in the conveyer until they reach the delivery portion of the machine. The guard 20 is suitably supported on posts carried by the main frame. At 21 is a magazine supported by frame 1 in elevated position respecting the conveyer adapted to contain the collapsed receptacles or cartons A to be delivered successively to the conveyer. The magazine is shown supported over sprocket 2 upon posts 22 carried by the main frame, and an ejector is indicated at 23 reciprocative beneath the magazine in spaced guides 24 supported by said posts (Figs. 10 to 13). The ejector is shown provided with spaced fingers 23ª adapted to pass under and to support the receptacles A within the magazine, and the said ejector is also provided with spaced projections 23ᵇ thereon of such height as to engage and push the lowermost receptacle A from the stack thereof in the magazine each time the ejector is moved to the left in Fig. 11. The ejector is reciprocated in timed relation to the steps of the conveyer, and is shown pivotally connected with a link 25 pivoted to a lever 26 journaled at 27 and pivotally connected with a rod 28 having a slotted portion at 28ª reciprocative upon drive shaft 12. A cam 29 is secured on said shaft and coöperates with a projection 30 on rod 28 to reciprocate the latter therewith and the ejector, (Fig. 13). At one side of the magazine 21 is a transferring device shown comprising spaced fingers 31 adapted to receive fingers 23ª therebetween and carried by a bar 32 adapted to rest upon guides 24, which bar is secured to a rock shaft 33 journaled in bearings 34 shown secured to one of the guides 24 (Figs. 10, 11). Shaft 33 has a crank arm 35 pivotally connected by a link 36 with rock arm 37 journaled upon frame 1 and operative in timed relation to ejector 23, (Figs. 1 and 7). While the arm 37 may be rocked in any suitable way the same is shown connected by a link 38 with crank arm 39 secured on shaft 40 which shaft is connected by crank arms 41 with links 42 pivoted to a block 42ª having a slot 42ᵇ guided by shaft 12. Said block has a pin 43ª coöperative with cam 43 on shaft 12 (Figs. 1 and 16), whereby when shaft 40 is rocked the fingers 31 will be rocked to raise receptacle A thereon to an inclined position. As such receptacle is raised its lower edge slides along a curved guide 44, (Figs. 1, 4, 7, 9 and 13), the upper portion of which guide is curved on an arc described around the axis of shaft 33 and the lower part of which guide is disposed over a receiver of the conveyer when the latter is stationary. The lower portion of the guide 44 is angularly disposed with respect to the direction of travel of the conveyer, (Fig. 9), and said guide is within a guard or housing 45 secured over the adjacent portion of the conveyer, whereby as the fingers 31 are raised the receptacle A thereon will be caused to slide endwise into the receiver of the conveyer therebeneath, (Fig. 9). The timing of the parts is such that the ejector will transfer the lowermost receptacle A from the magazine to the fingers 31 in succession, and each time the conveyer comes to rest said fingers rise and transfer the receptacle A thereon to guide 44 for depositing the receptacle in the receiver, and said fingers will return to receive another receptacle from the magazine, and so on successively. The lower part of guard 45 is open at 45$^a$ for the passage of the receptacles, (Fig. 13).

After the receptacle has been deposited in the receiver of the conveyer the latter will move to carry such receptacle along the guides 18, 20, to a position for opening the collapsed receptacle, it being noted that the lower flaps of the receptacle ride on guide 18 and the upper flaps project upwardly (Figs. 7, 15 and 21). At 46 is a flap spreader shown in triangularly disposed tapering form (Figs. 1, 7, 15, 20 and 21) adapted to enter between the upper flaps $a, a'$ of the receptacles to spread them to permit the admission of the receptacle opener. The spreader 46 is adapted to reciprocate toward and from the receptacles and is shown secured to arm 47, journaled upon pin 48 projecting in angular position from arm 49 secured to standard 50 carried by frame 1. The arm 47 is connected by a spring 51 with arm 49 by means of interposed brace 52 the spring being adapted to rock spreader 46. Said spreader is normally retained at one side of the receptacle and is caused to enter the receptacle by means of a rod 53 (Fig. 15) shown pivotally connected with arm 47 (Fig. 20) which rod is slidably connected with rocking arm 54, a stop 53$^a$ on rod 53 causing arm 54 to raise rod 53. Arm 54 is pivotally supported at 55 upon a post 17, a rod 56 being pivotally connected to arm 54. The lower end of rod 56 is shown slotted for coöperation with drive shaft 12 and provided with projection 57 coöperative with cam 58 secured on said shaft, (Fig. 15). At the time receptacle A comes to rest adjacent to spreader 46, the latter will descend and enter between the flaps $a, a'$ to spread the same to admit the receptacle opener 59, (Fig. 21.) The opener 59 is secured to a reciprocative and rocking angularly shaped rod 60 guided in correspondingly shaped bearing 61 carried by an arm 62 secured to standard 50. The opener 59 is depressed by means of arm 63 coöperative with rod 60 and slidable on standard 50, which arm 63 is pivotally connected by means of link 64 with rock arm 54. The opener 59 is caused to swing laterally when within receptacle A to square the latter within the receiver 13 by the following means:—An arm 65 secured to rod 60 (Figs. 15, 19) is pivotally connected with link 66 that is pivotally connected with crank arm 67 secured upon a shaft 68 journaled upon the main frame (Figs. 4 and 19), which shaft has a crank arm 69$^a$ connected by a link 69 with crank 70 secured on a transverse shaft 71 journaled in the main frame. Shaft 71 is rocked by connection with drive shaft 12 as follows:—Crank arms 72 secured on shaft 71 are pivotally connected by link 73 with a block 74 (Figs. 2 and 15), slidable on shaft 12, (which may be in the manner shown with respect to block 42$^a$ in Fig. 16), which block 74 is provided with a projection coöperative with a cam 75 secured on shaft 12, (Figs. 1, 2 and 5), whereby said cam will cause said block to reciprocate to rock the shaft 71. The arrangement is such that when arm 54 descends the rod 53 will descend and permit spring 51 to depress spreader 47 to cause it to enter and spread flaps $a, a'$ of the receptacle A then beneath the opener, and during such descent of arm 54 the opener will be depressed into a receptacle between said spread flaps, the arm 54 descending along rod 53. When the downward movement of the opener ceases the rod 60 will be rocked to cause the opener to swing toward the conveyer. Said movement of the opener causes it to bear against one side of the receptacle A and to drag the outward portion of the receptacle against the adjacent member 13$^a$ of the receiver, causing the receptacle to be squared and nested in the receiver with the opener adjacent to the conveyer, substantially as illustrated in Fig. 23. Arm 54 will rise, spring 51 will withdraw spreader 46 from the receptacle or carton, and opener 59 will be raised and restored to its initial position above the conveyer, corresponding operations occurring with each succeeding receptacle A brought to rest below the opener.

At a position spaced along the machine from the location of the opener, in the path of travel of the upper flaps of the receptacles, above the conveyer, are spaced flap guides 76 which extend around the machine for a distance along the conveyer, and have upturned inwardly disposed ends 76$^a$ in the path of travel of the upturned side flaps $a, a^2$, which ends encounter said flaps as the receptacles travel along and cause the same to be spread outwardly (Fig. 24), the lower edges of said flap spreaders being in position to retain said flaps spread for a distance during the travel of the receptacles. The guides 76 are hung by brackets 76$^b$ from rail 76$^c$ secured on frame 1 by supports 76$^d$ (Fig. 28). Approximately beneath said ends 76$^a$ of the guides 76 are located means to close the lower flaps $a^4, a^5$, comprising the depressed tongue-like portion 18$^b$ of guiding way 18$^a$ which encounters flap $a^4$ to close it as the receptacle travels, and the lower flap closer 77 pivotally supported and suitably actuated to engage the lower flap $a^5$ to fold it within flap $a^4$ just before the latter is folded by the portion $18^b$ (Figs. 1, 7, 24, 25, 26). The flap closer 77 is rocked in correspondence with the operation of the opener 59, and is secured to rock shaft 78 journaled in bearings in the main frame and provided with crank arm 79 connected by link 80 with crank arm $70^a$ on shaft 71 (Figs. 1 and 8), whereby as the latter is rocked the closer 77 will be rocked. The arrangement is such that as the receptacle approaches the closers $76^a$ and $18^b$ the closer 77 will engage the flap $a^5$ and fold it inwardly whereupon the travel of the receptacle will cause flap $a^4$ to be folded against flap $a^5$ and flap $a^4$ will continue to ride against the guiding way $18^a$ and said way $18^a$ will engage the lower side flaps $a^6$, $a^7$ and spread them. The receptacle will travel along the guiding way $18^a$ in such a manner that the lower flaps $a^4$, $a^5$ will be kept closed and the side flaps $a^6$, $a^7$ will be kept spread for a certain distance of travel. At a position in the course of the receptacle, in the condition last named, a spreader 81 for top flaps will descend between the flap spreader guides 76 to spread the upper end flaps $a'$, $a^3$ (Figs. 1, 5, 8, 16, 27). Said spreader 81 is shown carried by arm 82 from which the spreader depends, which arm extends from the upright 83, the lower end of which is connected to block $42^a$ (Fig. 16). The arrangement is such that when the receptacle comes to rest beneath spreader 81 it will descend and spread the flaps $a'$, $a^3$ (Fig. 8 and 27).

After the spreader 81 is operated the lower side flaps $a^6$, $a^7$ are gummed before they are folded against the previously folded flaps $a^4$, $a^5$. For such purpose rollers 84 are spaced in the path of the flaps $a^6$, $a^7$, which rollers are secured upon shaft 85 and dip in a receptacle 86 supported upon the main frame and containing suitable adhesive material (Figs. 1, 5, 8). A pulley 87 on shaft 86 receives a belt or chain 88 from a pulley 89 secured on shaft 90 journaled in the main frame. A sprocket 91 on said shaft receives a chain 92 from a sprocket 93 secured on shaft 94 journaled in the main frame (Figs. 1, 2, 15). Shaft 94 carries a gear 95 in mesh with gear 96 on the shaft 97 journaled in the frame, which shaft has a gear 98 in mesh with gear 99 secured on shaft 12. (Figs. 2 and 4). Shaft 97 also has a loose gear 100 in mesh with pinion 101. A pulley 102 loose on shaft 12 and secured to pinion 101 receives a belt 103 from the prime mover 104 for driving the machine. A clutch 105 (Figs. 2 and 4) is operative by means of shaft 106 having handle 107 for coupling the gear 100 to shaft 97 for driving the machine and for stopping it, as desired.

When the receptacle has passed over the rollers 84 the latter will apply paste to the under surfaces of the flaps $a^6$, $a^7$ and the continued travel of the receptacle will cause said flaps to encouter folders 108, 109 (Figs. 1, 5, 8, 17 and 18) suitably shaped to encounter said flaps and cause them to be folded against the previously folded flaps $a^4$, $a^5$ to seal said flaps.

After the last named flaps are sealed the receptacle is brought to rest in position to receive a liner. A receptacle is brought to rest with its sealed flaps upon a plate 110 in the line of guiding way $18^a$, which plate is preferably adjustable by means of a screw 111 (Fig. 8) where the receptacle comes to rest. Means for lining the receptacles are arranged as follows: A roll of suitable paper strip 112 is pivotally supported at $112^a$ (Fig. 28) and passes between guide rollers 113, $113^a$, and between feed rollers 114, 115 (Fig. 29), the strip passing thence through guide 116 over a table or plate 117 and beneath a movable knife 118 coöperative with stationary knife 119. The rollers 113, $113^a$ are rotated slowly to provide a slack at $112^b$ in the strip to be fed to the feed rollers 114, 115, for which purpose the shaft $113^b$ of roller 113 is provided with a sprocket 120 receiving a chain or belt 121 from a sprocket 122 secured on shaft 12. The feed roller 114 is operated intermittently corresponding to the stopping of each receptacle beneath the strip 112. For such purpose the shaft of roller 114 is shown provided with a sprocket 123 receiving a chain or belt 124 from a sprocket 125 secured upon shaft 126 journaled in the main frame, (Figs. 3 and 28). A slotted member 127 of a Geneva movement is carried by shaft 128 journaled in the main frame, which member is coöperative with projection 129 on an arm 130 secured on shaft 12, whereby when said shaft is rotated the Geneva member 127 will be rotated intermittently, (Figs. 3 and 28). The shaft 128 is provided with a gear 131 in mesh with gear 132 on shaft 126 (Figs. 1 and 3) whereby as the Geneva member 127 is rotated the chain or belt 124 will be operated step by step to correspondingly operate roller 114 to feed the paper strip correspondingly intermittently since rollers 113, $113^a$ feed the strip continuously and rollers 114, 115 feed the strip intermittently, the slack in the strip at $112^b$ will be formed to relieve strain on the strip at rollers 114, 115. Roller 115 is spring pressed toward roller 114 by means of spring $115^a$ said roller 115 being shown carried by toggle arms $115^b$ pivotally supported upon the main frame, (Fig. 29). The strip 112 is fed over an opening $117^a$ in table or plate 117 and cut off in lengths, indicated at $112^a$, to form linings for the receptacles therebeneath, (Figs. 29 to 38), when cut off by the knife 118. Said knife 118 is pivotally supported at 133 on the main frame, and is shown pivotally connected with a rod 134 (Fig. 8) having a slotted low end guide upon shaft 40 and provided with a projection 135 cooperative with cam 136 secured upon said shaft, whereby when said shaft is rocked the knife will be rocked to cut lengths of linings 112$^a$ from strip 112. Said knife operates successively for succeeding receptacles brought to rest beneath opening 117$^a$ of table or plate 117. The opening 117$^a$ of said table is normally closed by rockable fingers 137 that are pivotally supported at 138 on opposite sides of opening 117$^a$ above a guide 139 extending below the opening 117$^a$ over plate 110, (Fig. 8). Guide 139 comprises two spaced plates secured to and depending from table 117, opposite sides of the guide being open. Fingers 137 are normally held transversely of the guide in horizontal position respecting opening 117$^a$ by springs 140 connecting said fingers with the frame to guide the advancing strip (Fig. 29), which fingers are adapted to be depressed with lining strip 112$^a$ by means of a plunger 141 adapted to force the lining through guide 139 into the receptacle beneath. Plunger 141 is shown carried by block 142 guided upon posts 143 supported upon the main frame, which block is pivotally connected, as by a pin and slot connection shown at 144 (Fig. 28), with rock arm 145 pivotally supported at 146. Arm 145 is pivotally connected with rod 147 having a slotted lower end guided by drive shaft 12 and provided with a pin 148 coöperative with a cam 149 on shaft 12 (Figs. 1, 2 and 28), whereby the plunger will operate in timed relation to the severing of strip 112 by knife 118 and to the stopping of the receptacles beneath the plunger. When the plunger descends upon lining strip 112$^a$ fingers 137 will be tilted to permit entrance of the plunger with the strip into guide 139, said fingers entering slots 139$^a$ in said guide. Said strip will be folded, substantially as indicated in Figs. 34 and 36, during a portion of the descent of the plunger. The margins 112$^b$ of lining strip 112$^a$ then will extend on opposite sides of the plunger (Fig. 34), and are to be folded against such sides of the plunger, (Fig. 35), to a dimension permitting the folded lining to enter the receptacle beneath. Folders 150 are arranged in pairs on opposite sides of the open sides of guide 139 (Figs. 29, 31) adapted to coöperate with the marginal portions 112$^b$ of the lining strip 112$^a$ that protrude through the open sides of the guide to fold the margins 112$^b$ against the plunger, (Fig. 35). Said folders are shown provided with adjustment slots 150$^a$ receiving the rods 151, and said rods respectively are connected with reciprocative bars 152 shown having slots 153 slidable upon bars or shafts 154, 154$^a$ supported by the main frame. The slotted parts 150$^a$ are clamped on rods 151 respectively. The shaft 154 is provided with oppositely disposed crank arms 155, 156 respectively connected by links 157, 158 with corresponding bars 152, whereby when said shaft and arms are rocked said bars will be reciprocated to correspondingly reciprocate the folders 150. Shaft 154 has a crank arm 159 (Figs. 29 and 30), pivotally connected with link 160 that is pivotally connected with rock arm 161 journaled at 162 upon the main frame (Fig. 28), which rock arm coöperates with a cam 163 on shaft 12. A spring 164 connecting arm 161 with the main frame causes the arm to coöperate with said cam. Said arm will be rocked in timed relation to the descent of plunger 141 to cause folders 150 to fold the margins 112$^b$ of lining strip 112$^a$. The lower corners 112$^c$ of the lining strip on opposite sides protrude laterally (Figs. 35, 37) due to the folding of the margins 112$^b$ of the lining strip by the folders 150, and said corners 112$^c$ encounter rollers 165 as the lining is pushed downward by plunger 141. Rollers 156 have shafts or studs 165$^a$ slidably supported in slots 166 in bars 167 secured adjacent to the lower end guide 139, (Figs. 8, 29, 30 and 32). Springs 168 connecting the corresponding end portions of rollers 165 normally draw said rollers toward each other. When the protruding ends 112$^c$ of the partially folded lining are forced by plunger 141 against the rollers 165 such ends will be folded upwardly along the lining (Fig. 37), the rollers spreading apart sufficiently for the purpose, and upon farther descent of the plunger the folded lining will be deposited in the receptacle beneath, (Fig. 38). By first folding the marginal portions 112$^b$ at the sides of the plunger and then folding the corner portions 112$^c$, the latter are along the bottom exterior portion of the lining and prevent leakage at such bottom, affording also a smooth interior without diagonal seams on the inside of the lining which would have a tendency to permit leakage. Each time a receptacle comes to rest beneath plunger 141 a lining will be cut off of strip 112, folded and inserted in the receptacle, and the plunger will rise therefrom, the upper flaps of the receptacle having been spread to receive the lining.

At a position suitably disposed along the conveyer from the lining devices, as on the opposite side of the machine illustrated in Figs. 4, 5 and 15, suitable means are provided for charging the lined receptacles and for closing and sealing their upper flaps. At 169 are spaced pressers shown carried by the arms 82 on the side of the machine opposite spreader 81, which pressers are adapted to descend upon the lining 112$^a$ to push it into receptacle A in case the liner should rise in the receptacle, as upon withdrawal of plunger 141 therefrom. Said pressers will descend when the spreader 71 descends and will rise therewith. Spaced along the conveyer, in the direction of travel of the corresponding side thereof, at a suitable distance from said pressers is a hopper 170 having a delivery chute or spout 171 over the conveyer in position to deliver goods into the lined receptacle, (Fig. 15), brought to rest beneath the chute. Beneath said chute is a funnel or receiver 172 to catch and deliver any overflow of the goods, (Fig. 15). The goods to be charged into the receptacle may be weighed or measured by any suitable or well known mechanism for the purpose so that definite charges of goods, such as tea, cocoa or the like, may be delivered into the hopper successively for passage through chute 171 into the receptacle at rest beneath the chute. Preferably at the charging position of the receptacle means are located to agitate the same while receiving the goods for which purpose an agitator indicated at 173 is shown in the form of a rod $173^a$ secured to the arm 174 pivotally supported at 175 upon the main frame, (Figs. $5^a$ and 15). Arm 174 has a projection 176 coöperative with a ratchet wheel 177 secured on shaft 90 whereby as said shaft is rotated the agitator will operate against the bottom of the receptacle to agitate the same to cause settling of the goods in the receptacle, the agitator being shown adapted to jar the way $18^a$.

After the receptacle has been charged it is stepped along with the conveyer to have its upper flaps closed and sealed. For such purpose a closer 178, having upturned receiving end $178^a$, is located in position over the receptacle to engage the advancing end flap of the receptacle and close it thereover, with the upper part of the lining, (Fig. 41). Said closer is suitably carried by support 179 secured upon the main frame. At 180 is a closer for the opposite end flap, which closer is pivotally supported at 181 upon bracket 182 shown supported by the main frame, which shaft has a crank arm 183, (Figs. 4 and 41), pivotally connected with a link 184 connected with crank arm 185 secured on shaft 40, (Fig. 5), whereby as said shaft is rocked said closer 180 will be rocked to close the corresponding flap and part of the lining over the preceding flap closed by the closer end $178^a$. Said closed flaps pass under closer 178 and along projecting tongue thereof $178^b$ for a suitable distance, during which travel of the receptacle its side flaps are pasted. Pasting rollers 185 are secured on shaft 186 journaled on arms 187 projecting from a paste receptacle 188 shown pivotally supported at 189 on shaft 190 supported by brackets 191 carried by the main frame, (Figs. 4, 40, 41, 42). Said rollers are supplied with paste or other desired adhesive from such receptacle, and are rotated to apply paste to the projecting side flaps of the receptacles as the latter travel along. Rollers 192 are shown pivotally carried by arm 193 pivotally supported at 194 and adjustable toward corresponding roller 185 by adjusting screw 195, (Fig. 41). The corresponding side flaps of the receptacles pass between rollers 185 and 192, and on the other side of the conveyer the corresponding side flaps travel along the guide 196, (Figs. 40-42), which flaps receive paste from the roller 185 above. The arm 193 is adapted to position the rollers 185 with respect to the flaps passing thereunder. A sprocket 197 on shaft 186 receives a chain 198 driven by sprocket 199 on shaft 90. Rollers 185 are thus rotated as required to apply paste to the side flaps. After said flaps have been pasted they pass along flap closers 200, 201 (Figs. 4, 40 and 41), which flap closer 200 is shown in curved tongue-like form supported at 202 upon guide 196 and extending therefrom over the receptacle in the conveyer, adapted to engage flaps $a$ and fold them over upon the previously closed end flaps as the receptacles travel along. The closer 201 is in curved tongue-like form at its receiving end adapted to engage flap $a^2$ and fold it over upon flap $a$, said guide 201 being supported over the adjacent portion of the receiver of the conveyer and extending therealong adjacent to the point of discharge of the closed receptacle to retain the flaps closed. Supports 203, which may be secured to guide 20, retain guide 201 in position.

When the charged and sealed receptacles are brought to delivery position they pass from under guide 201 in position to be engaged by ejectors to be transferred to delivery belts. Said ejectors are shown at the same end of the machine as the magazine 21 and adjacent thereto, the ejectors being in the form of upper and lower fingers 204, 205, the fingers 204 being shown carried by reciprocative rod 206, (Figs. 1, 4, 6, 13), by means of a transverse arm 207. The adjacent end portion $206^a$ of rod 206 is shown depending and provided with a bar 208 carrying the ejector fingers 205. Said fingers are adapted to pass behind the charged receptacles on the conveyer and to move outwardly to discharge the receptacles therefrom, the fingers 205 being shown operable in slots 209 in the forward portion of the guiding way 18, (Figs. 4 and 6), for sliding the receptacles outwardly along said way. Rod 206 is slidably guided in bearings 210 supported on the main frame, which rod is shown pivotally connected with a link 211 pivotally connected with a crank arm 212 secured on shaft 40, (Figs. 5, 7 and 8), whereby as said shaft is rocked the ejectors 204 and 205 will be reciprocated to eject the charged receptacles from the conveyer.

Each time the conveyer comes to rest said ejectors will be reciprocated, and while they are retracted, (Fig. 6), the ejectors will permit passage of the receptacle A in front thereof. The ejected receptacles are delivered by the ejectors between delivery belts 213 and 214. Said belts are carried by rollers 215 journaled in uprights 216 carried by extension 217 of the main frame (Fig. 1). The shaft of one of said rollers is provided with gear 218 in mesh with gear 219 secured on shaft 220 journaled in suitable bearings and provided with a gear 221 in mesh with gear 222 secured on shaft 90 (Fig. 4), whereby as said shaft is rotated the lower belt 214 will be operated in the direction of the arrow in Fig. 1, and since the upper and lower ends of the receptacles are in engagement with the upper and lower belts 213 and 214, respectively, the upper belt will be operated with the receptacles, whereby the latter will be carried along by said belts and delivered to any suitable receptacle.

In accordance with the machine described it will be understood that the receptacles or cartons will be delivered successively to the receivers of the conveyer according to the step by step operation thereof, and that the operations upon the receptacles for opening them, for spreading and closing flaps, making the linings and inserting them in the receptacles, charging the receptacles, and finally sealing and closing the upper flaps occur in substantially simultaneous actions respectively upon different receptacles spaced along the conveyer, whereby for each step by step operation of the conveyer a charged and sealed receptacle is delivered. One of the advantages of the invention is that by having the conveyer supported to operate in a horizontal position upon the horizontally disposed wheels 2, with the receivers of the conveyer laterally disposed, the machine can be made relatively short in length and thereby enable devices for performing certain operations upon the receptacles to be on one side of the machine and devices for charging and performing the other operations upon the receptacles to be on the opposite side of the machine, whereby the supply magazine for the collapsed receptacles may be at one end of the machine adjacent to the delivery point. The arrangement enables the attendant to keep the magazine charged with collapsed receptacles and to observe the delivery of the charged receptacles close at hand, while permitting ready observation of the operations taking place upon different receptacles, without requiring the attendant to keep moving back and forth from one end of the machine to the other for such purposes, as is customary with machines of the class described where all the operations occur along one side of a conveyer that extends for a considerable length along the machine, and wherein the collapsed receptacles are supplied at one end of the machine and the charged receptacles are delivered from the opposite end of the machine.

This invention is not limited to the details of construction and relative arrangement of parts set forth as the same may be varied within the scope of the appended claims without departing from the spirit of the invention.

Having thus described my invention, what I claim and desire to secure by Letters Patent is:—

1. A machine of the class described comprising a frame, a conveyer provided with spaced receivers, means to support and operate the conveyer, a magazine for receptacles, means to deliver receptacles from the magazine, a transferring device to receive the receptacles from the magazine, and means to operate the transferring device to deliver receptacles to said receivers.

2. A machine of the class described comprising a frame, a conveyer provided with spaced receivers, means to support and operate the conveyer, a magazine for receptacles, means to deliver the receptacles from the magazine, a transferring device to receive the receptacles from the magazine, means to operate the transferring device to deliver receptacles to said receivers, and a guide above the receiver adjacent to said device to receive the receptacles and guide them to the receiver.

3. A machine of the class described comprising a frame, a conveyer provided with spaced receivers, means to support and operate the conveyer, a magazine for receptacles, means to deliver receptacles from the magazine, a transferring device to receive the receptacles from the magazine, means to operate the transferring device to deliver receptacles to said receivers, a guide above the receiver adjacent to said device to receive the receptacles and guide them to the receiver, and a guard adjacent to said guide to direct the receptacles into the receiver of the conveyer.

4. A machine of the class described comprising a frame, a conveyer provided with spaced receivers, means to support and operate the conveyer, a magazine for receptacles, means to deliver receptacles from the magazine comprising a pivoted bar, fingers carried by said bar to receive receptacles from the magazine, means to rock said bar and fingers to direct the receptacles toward the receiver, and a guide between said fingers and the receivers for guiding the receptacles thereto.

5. A machine of the class described comprising a frame, a conveyer provided with spaced receivers, means to support and operate the conveyer, a magazine for receptacles, means to deliver receptacles from the magazine comprising a pivoted bar, fingers carried by said bar to receive receptacles from the magazine, means to rock said bar and fingers to direct the receptacles toward the receiver, and a guide between said fingers and the receivers for guiding the receptacles thereto, said guide having an upper portion curved substantially along an arc described around the axis of said bar and having a depending portion over the receivers to guide the receptacles thereto.

6. A machine of the class described comprising a frame, a conveyer having receivers, means to support and operate the conveyer upon the frame, a magazine for receptacles, a reciprocative ejector having spaced fingers operative beneath the receptacles and having one or more projections to eject receptacles from the magazine, a transferring device for the receptacles comprising a pivoted bar having spaced fingers therebetween for the receptacles thereon, means to rock said bar, and guiding means below the bar over the receivers to direct receptacles thereto.

7. A machine of the class described comprising a conveyer having receivers for receptacles, means to support and operate said conveyer, a flap spreader, means to cause said spreader to enter between the flaps of the receptacles and spread them, an opener to enter the receptacles, and means to operate the opener to cause it to enter receptacles between the spread flaps to square the receptacles in the receivers and to recede thereform.

8. A machine of the class described comprising a conveyer having receivers for receptacles, means to support and operate said conveyer, a flap spreader having a tapering portion to enter between the flaps of the receptacles and spread them, means to move said spreader toward and from said receptacles, an opener to enter the receptacles between the spread flaps thereof, said spreader retaining the flaps spread for entry of the opener, and means to cause the opener to enter the receptacles between the spread flaps to square the receptacles in the receivers and to recede from the receptacles.

9. A machine of the class described comprising a conveyer having receivers for receptacles, means to support and operate said conveyer, a flap spreader to enter the receptacles and spread the flaps, means pivotally supporting said spreader for movement toward and from the flaps, a spring coöperative with the spreader to cause it to operate with respect to said flaps, means to operate the spreader reversely to its operation by the spring, an opener adapted to enter the receptacles between the spread flaps thereof, and means to cause the opener to enter the receptacles to square them in the receiver and to recede from the receptacles.

10. A machine of the class described comprising a conveyer having receivers for receptacles, means to support and operate said conveyer, a flap spreader to enter the receptacles and spread the flaps, means pivotally supporting said spreader for movement toward and from the flaps, a spring coöperative with the spreader to cause it to enter between the flaps, a rod connected with said spreader, means to operate the rod to permit the spring to operate the spreader and to operate the spreader reversely, an opener adapted to enter the receptacles between the spread flaps, and means to operate the opener to enter the receptacles to square them in the receiver and to recede from the receptacles.

11. A machine of the class described comprising a conveyer having receivers for receptacles, means to support and operate said conveyer, a flap spreader to enter the receptacles and spread the flaps, means pivotally supporting said spreader for movement toward and from the flaps, a spring-coöperative with the spreader to cause it to enter between the flaps, a rod connected with said spreader, an arm having means coöperative with said rod to permit the descent of the latter and the spreader and to move farther independently of the rod and adapted to raise the rod and the spreader, an opener adapted to enter between spread flaps of the receptacles, means connecting said arm with said opener to depress the latter into the receptacles and to continue therein when the spreader is stopped upon the receptacles and means to rock said opener to square the receptacles in the receivers, said arm being operative to raise the opener and the spreader after the receptacles have been opened.

12. A machine of the class described comprising a frame, a conveyer, means to support the conveyer horizontally, the conveyer having laterally disposed receivers, means to support receptacles on end in said receivers, guiding means for said receptacles while in the receivers, an opener above the conveyer adapted to enter the receptacles, a rod carrying said opener for descent into and to rise from the receptacles, means to reciprocate the opener, an arm secured to said rod to rotate it, and means to rock said arm to swing the opener to square the receptacles in the receivers.

13. A machine of the class descirbed comprising a frame, a conveyer, means to support the conveyer horizontally, the conveyer having laterally disposed receivers, means to support receptacles on end in said receivers, guiding means for said receptacles while in the receivers, an opener above the conveyer adapted to enter the receptacles, means to operate the opener in the receptacles in the receivers, means to close the lower flaps of the receptacles, a spreader adapted to engage upper flaps of the opened receptacles to flare them, and means to operate said spreader.

14. A machine of the class described comprising a frame, a conveyer, means to support the conveyer horizontally, the conveyer having laterally disposed receivers, means to support receptacles on end in said receivers, guiding means for said receptacles while in the receivers, an opener above the conveyer adapted to enter the receptacles, means to operate the opener in the receptacles in the receivers, a guide having a receiving end to engage lower flaps of the receptacles to fold them, a movable flap closer to fold the corresponding opposing lower flaps, said guide maintaining said flaps closed and in position to spread and so retain the side flaps as the receptacles travel, means to apply paste to the last named flaps, and spaced folders to engage said flaps as the receptacles travel to fold said flaps on the previously folded flaps.

15. The combination of a frame, a conveyer having receivers for receptacles, means movably supporting the conveyer on the frame, means to operate the conveyer step by step, means to supply receptacles to the receivers, means to open the receptacles, mechanism to apply linings in the receptacles, pressing means over the receptacles adapted to engage protruding linings to push them into the receptacles, and means to operate said pressing means.

16. A machine of the class described, comprising a frame, a conveyer, means for supporting and for operating the conveyer, said conveyer having receivers, means to supply collapsed receptacles, means to insert said receptacles on the edges of their protruding flaps in an upright position in said receptacles, and means to open the receptacles while on said edges.

17. A machine of the class described comprising a frame, a conveyer, means for supporting and for operating the conveyer, said conveyer having receivers, means to supply collapsed receptacles in a horizontal position, means to deliver said receptacles into said receivers in vertical position, and means to open said receptacles while in the last named position.

ERNEST D. ANDERSON.